June 23, 1959    R. L. CARLSTEDT    2,891,424
DEPTH GAGE FOR BORING MACHINES
Filed April 17, 1957    5 Sheets-Sheet 1

INVENTOR.
RAGNAR L. CARLSTEDT
BY
*Taulmin & Taulmin*
Attorneys

June 23, 1959 R. L. CARLSTEDT 2,891,424
DEPTH GAGE FOR BORING MACHINES
Filed April 17, 1957 5 Sheets-Sheet 2

INVENTOR.
RAGNAR L. CARLSTEDT
BY
Attorneys

June 23, 1959 R. L. CARLSTEDT 2,891,424
DEPTH GAGE FOR BORING MACHINES
Filed April 17, 1957 5 Sheets-Sheet 3

INVENTOR.
RAGNAR L. CARLSTEDT
BY

United States Patent Office 2,891,424
Patented June 23, 1959

2,891,424

DEPTH GAGE FOR BORING MACHINES

Ragnar L. Carlstedt, Cincinnati, Ohio, assignor to The R. K. Le Blond Machine Tool Co., Cincinnati, Ohio, a corporation of Delaware Application April 17, 1957, Serial No. 653,430

13 Claims. (Cl. 77—3)

This invention relates to deep hole boring machines and in particular to a depth gage for indicating the depth of the hole being bored in the machine. This invention is also concerned with a novel control system for a boring machine interlocked with the depth gage to control the operation of the boring machine.

Boring machines of the nature with which the present invention is adapted for being employed are of the type in which a workpiece is clamped against a rotary spindle and a bore is then formed in the workpiece by pressing a non-rotating boring bar or tube against the end of the workpiece. Workpieces that are particularly adapted for being bored in this manner are gun barrels, axles, hollow shafts and like work members that might be employed in engines or machine tools.

Since the boring of the workpieces is carried out at high speed, it follows that the cutting tool is apt to dull quite rapidly once it commences to lose its cutting edge and under these circumstances it becomes important to be able to determine when such dulling occurs and interrupt the machining cycle so that a new boring bar can be put in the machine to restore the high rate of speed of operation desired.

In the circumstances referred to above, as well as in any other circumstances where the boring bar might be retracted from the bore being made before the bore is completed, it is desirable to be able to determine the point at which the boring bar will again engage the workpiece when it is again returned to the bore.

Still further, when a relatively long workpiece is to be bored, the final portion of the bore, consisting of a fraction of an inch, can be completed with a dull boring tool and no damage will be done and no considerable amount of time lost.

With the foregoing in mind, it is a primary object of the present invention to provide an arrangement adapted for association with a boring machine of the nature referred to which indicates at all times the position of the boring bar that accomplishes the boring of the workpiece.

A still further object is the provision of an indicating device for a boring machine adapted for boring deep holes in workpieces in which an indication is given of the position of the boring bar and simultaneously there is given an indication of the depth of the hole in the workpiece that has been formed by the boring bar.

A particular object of the present invention is the provision of a control system in combination with an indicating device which will effect the immediate retraction of the boring bar from the workpiece whenever the cutting edge of the boring bar dulls to a predetermined degree.

A still further object of the present invention is the provision of a control system of the nature referred to above which provides for automatic retraction of the boring bar when the cutting edge thereof dulls but wherein the indicator mechanism renders the control system inoperative during the final part of the boring operation so that in the event of dulling of the tool toward the very end of the boring operation, the operation will still be completed.

A still further object is the provision of a control system for automatically retracting a boring bar when the cutting edge thereof becomes dull but where the indicator device that indicates the depth of the hole being formed prevents operation of the control system during and after the final portion of the boring operation so that the retraction of the boring bar after a boring operation has been completed is always accomplished manually.

A still further object is the provision of a relatively simple compact indicating mechanism of the nature described which is easy to adjust to accommodate it to workpieces of different lengths and to different strokes of the boring bar thereby imparting general utility to the indicating mechanism so that it can be employed in connection with any workpiece that the machine can accommodate.

These and other objects and advantages of this invention will become more apparent upon reference to the following specification taken in connection with the accompanying drawings, wherein.

Figure 1:
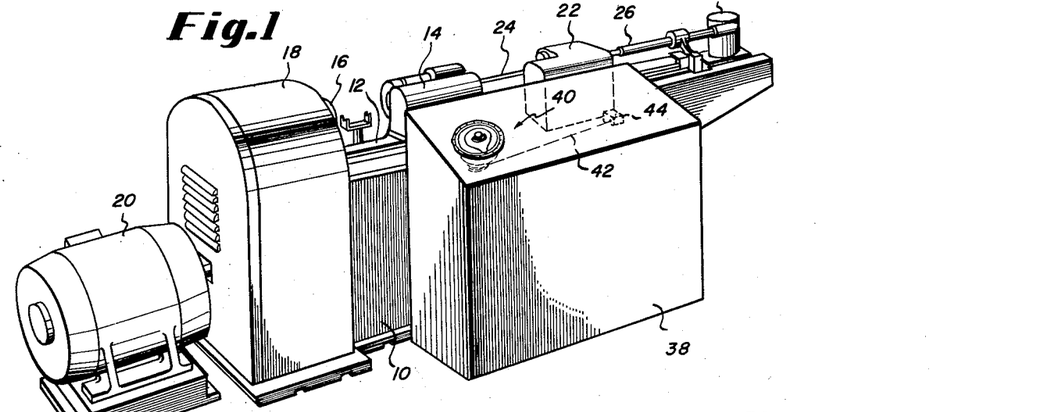
Figure 1 is a perspective view showing rather diagrammatically a boring machine embodying an indicating device according to the present invention.

Referring to the drawings somewhat more in detail, the machine illustrated in Figure 1 comprises a main frame part 10 formed on its upper side with a bed 12 on which is slidably mounted a clamp slide 14 adapted for clamping an elongated workpiece against a rotary spindle member 16 which is rotatably supported in spindle housing 18 and which spindle member is adapted for being driven in rotation by a drive leading from the said member to the shaft of electric drive motor 20.

Also mounted on bed 12 is a boring slide 22 that supports a boring bar 24 that extends through clamp slide 14 coaxially with the workpiece supported between the clamp slide and the spindle so that the boring bar can be pressed against the end of the workpiece and causing a bore to be formed therein. A suitable high pressure high volume supply of coolant is delivered to the bore in the workpiece through the clamp slide 14 and this fluid, together with chips formed in the bore, pass through the boring bar and then through the telescoping tubing 26 and a cyclone velocity reduction element 28 to a filtering system.

Figures 2, 7:
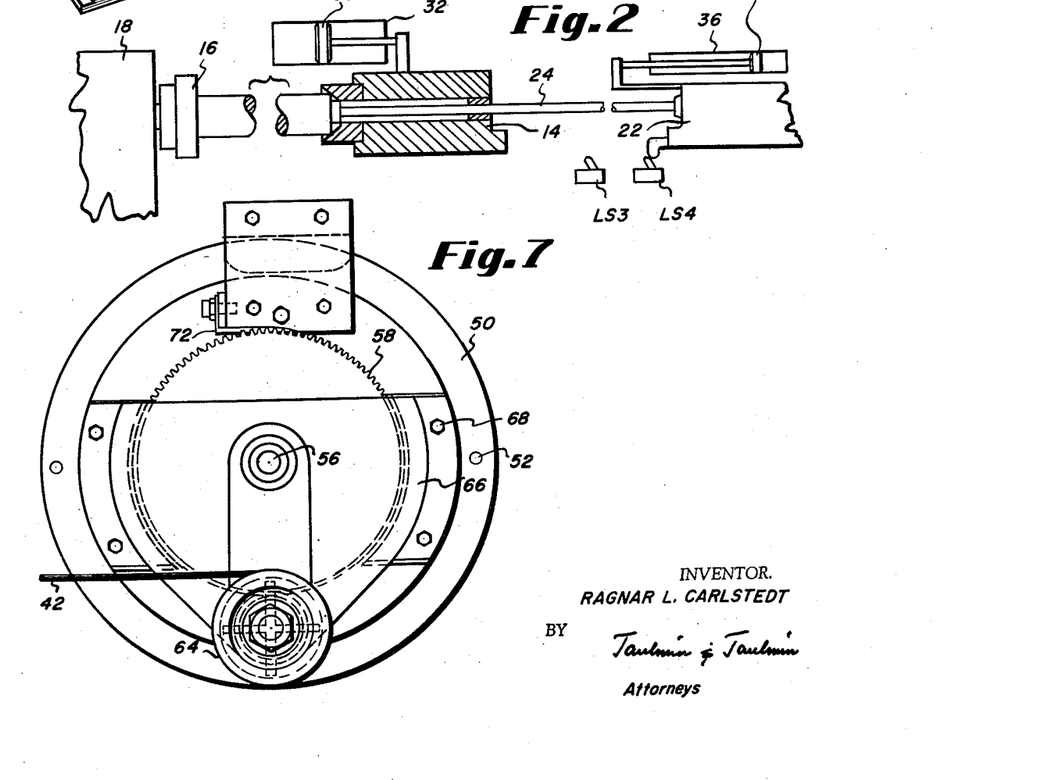
Figure 2 is a diagrammatic sectional view showing the principal parts of the machine of Figure 1 and the location of some of the control limit switches therein.
Figure 7 is a view looking in at the back of the indicator structure.

The clamp slide 14 and the boring slide 22 are adapted for being reciprocated by fluid motors connected therewith as diagrammatically illustrated in Figure 2. The clamp slide has a double-acting piston 30 connected therewith located in a cylinder 32 and the boring bar slide has a double-acting piston 34 connected therewith that is mounted in a cylinder 36.

Referring again to Figure 1, positioned on one side of the machine is a control cabinet 38 that has a top panel on which is mounted the various indicating gages and control switches and the like for controlling the operation of the machine. These gages and devices and switches are not illustrated, with the exception of the indicating device 40 constructed according to the present invention. The indicating device 40 has associated therewith a flexible element, such as cable 42, that is attached to boring slide 22 as at 44. It will be apparent that reciprocation of the boring slide will cause movement of cable 42 to and from the indicator device according to the present invention and through the medium of this cable the dials thereof are rotated, as will presently be described.

Referring now more particularly to Figures 3 through 7, the indicator device comprises a frame or housing 50 adapted for being attached to the panel of the control housing as by screws 52 and which screws also retain the stationary outer dial ring 54 in place.

The housing 50 has rotatable therein a shaft 56 which has pinned to its outer end a gear 58 that meshes with a pinion 60 mounted on a shaft 62 that carries a drum 64 about which the cable 42 passes. Shaft 62 is rotatably mounted in a bracket element 66 which is attached to housing 50 as by screws 68 as will be seen in Figure 7.

Pertaining to shaft 56 is a spiral spring 70 the inner end of which is connected with the said shaft and the outer end of which is anchored to a bracket 72. The spring is so arranged that it will maintain tension on cable 42 throughout the travel of boring slide 22. As boring slide 22 advances, the cable is thus wound up on drum member 64 and, when the boring slide retracts, the cable is pulled off from the drum. This movement of the cable and drum is accompanied by rotation of shaft 56 in the ratio of about 1:3 due to the reduction effected by pinion 60 and gear 58.

Shaft 56 extends inwardly to the interior of housing 50 and is formed therein with a frusto-conical end part 74. The shaft 56 is advantageously journaled in the back wall of housing 50 by a suitable bearing, such as a sleeve bearing. Part 74 of shaft 56 forms a part of a clutch mechanism, the other part of which takes the form of a ring 76 attached by screws 78 to a plate 80 that has a hollow portion extending into a bore in part 74 and another hollow portion extending outwardly through the right side of the indicator unit. The last-mentioned portion of plate 80 is externally threaded to receive a clamp nut 82 adapted for engaging a collar 84 in a recess in inner dial 86 which has frictional engagement with plate 80 through the medium of the disc 88. It will be apparent that pointer element 86 can be adjusted relative to plate 80 by loosening clamp nut 82 and can be fixedly locked to plate 80 by tightening of the said clamp nut.

The said projecting portion of plate 80 and which is hollow, is also internally threaded for receiving a clamp screw 90, the inner of which is adapted for engaging the bottom of the aforementioned recess in member 74. It will be evident that tightening of clamp screw 90 will fixedly connect clutch parts 74 and 76 together for rotation with shaft 56 while loosening of clamp screw 90 will permit adjustment of the clutch part 76 and the connected parts relative to clutch part 74.

Figure 3:
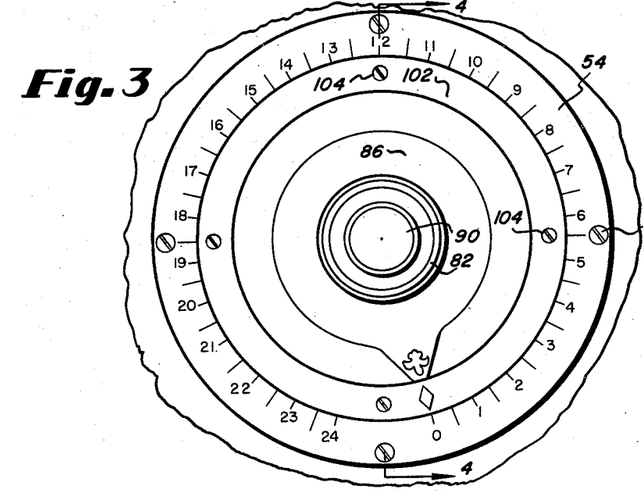
Figure 3 is a view looking in at the face of the dials of the indicator mechanism forming a part of the present invention with both of the movable indicator dials set at zero indicating the completion of a boring operation.
Figure 4:
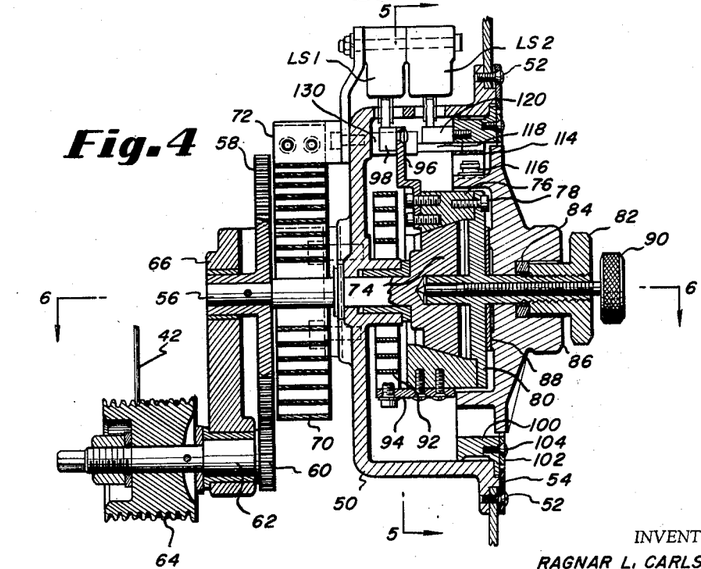
Figure 4 is a vertical sectional view through the indicator mechanism and is indicated by line 4—4 on Figure 3.
Figure 5:
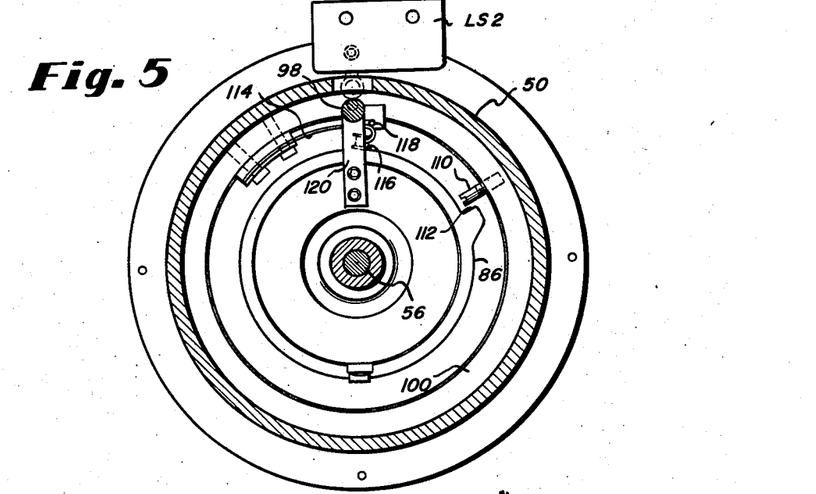
Figure 5 is a vertical sectional view indicated by line 5—5 on Figure 4 and looking at the back of the dial structures.
Figure 6:
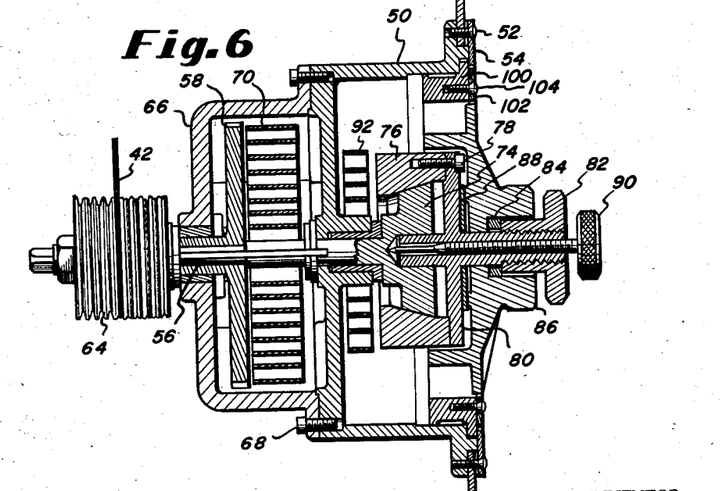
Figure 6 is a plan sectional view indicated by line 6—6 on Figure 4.

The clutch part 76, as will be seen in Figure 4, is likewise provided with a spiral biasing spring 92 which has one end anchored on housing 50 and its other end connected by clip 94 with clutch part 76. Spring 92 biases clutch part 76 and the parts connected therewith in a direction to turn counterclockwise as they are viewed from the right side of Figure 4 or as they are viewed in Figure 3.

The clutch part 76 also carries an arm 96 on which is mounted a limit switch actuating element 98 adapted for engaging a limit switch LS–1 carried on an upstanding portion of bracket 72 that is attached to housing 50. The limit switch LS–1 is positioned to be engaged by actuating element 98 when the boring slide has reached its fully retracted position and this switch thus forms a backstop for the boring slide.

Mounted within the open side of housing 50 and between the outer periphery of pointer element 86 is a ring 100 having a radial flange part extending into a recess about the mouth of housing 50 and being retained therein by dial ring 54. Ring 100 is also a pointer ring and has attached thereto the plate 102 as by screws 104.

The pointer elements 86 and 100 are movable in unison during continued advancing movement of the boring slide and the subsequent retraction thereof following a complete boring operation, but the pointer element 100 will remain in its advanced position any time that the boring bar is retracted before completion of a boring operation thereby to indicate the position in the workpiece that the boring bar will again engage the bottom of the bore being machined upon being returned into the said bore.

The foregoing is accomplished by providing ring 100 with an inwardly extending pin element 110 that projects into the path of a nose part 112 extending outwardly from pointer element 86 so that when pointer element 86 is moving in its advancing direction (counterclockwise, in Figure 5), it will drive pointer element 100 in the same direction and in the same amount. It will also be evident that movement of pointer element 86 in the opposite direction (clockwise as in Figure 5) will permit pointer element 100 to remain in position.

The pointer element 100 has attached thereto an arcuate hooklike spring element 114 which is adapted for engaging over the head of a pin 116 carried by pointer element 86. Spring 114 normally occupies a position where pin 116 will pass freely by, but when the boring slide approaches the end of its advancing stroke a cam pin 118 which is fixed in housing 50 engages spring 114 and moves it downwardly into position to engage the head of pin 116 whereby retracting movement of pointer element 86 will also be accompanied by retracting movement of pointer element 100. Due to the bias of spring 114, it immediately snaps free of pin 116 when pointer element 86 commences movement in its advancing direction at the beginning of the next work cycle.

Attached to the ring forming pointer element 100 is a switch actuating element 120 adapted for engaging and actuating a limit switch LS–2 just before the boring operation being carried out is completed.

Reference to Figure 3 will show that the stationary dial ring 54 is calibrated counter-clockwise and the indicia on this ring will thus indicate the length yet to be bored in a workpiece being machined. As the boring operation progresses the dial elements turn clockwise as viewed in Figure 3 toward zero and will reach zero at the completion of the boring operation.

In setting up the machine, the clamp screw 90 is loosened whereby the pointer elements are disconnected from the shaft 56. The clamp nut 82 is also loosened, thus disconnecting pointer element 86 from clutch part 76. The tension on spring 92 will cause clutch part 76 to turn counter-clockwise, as it is viewed in Figure 3, or clockwise, as it is viewed in Figure 5, until arm 96 strikes a stop bolt 130 fixed in housing 50. The said arm 96 is now in position that the switch actuating element 98 carried thereby is in actuating engagement with limit switch LS–1.

The boring slide is now advanced until it strikes the abutment 132 provided therefor at the rear side of the clamp slide as will be seen in Figure 2. The pointer elements 86 and 100 are then adjusted until their index points point to zero and the clamp nut 82 is then tightened. At this time the clamp screw 90 is also tightened. This simple operation sets the indicator to give a proper indication and to actuate its limit switches LS-1 and LS-2 at the proper time.

If for some reason or another the indicator has to be reset, due to there being a longer workpiece being placed in the machine, the clamp screw 90 is released and the clamp nut 82 is left tight. The switch controlling the retraction of the boring slide is then pressed and simultaneously the pointer element 86 is turned slightly counter-clockwise whereupon limit switch LS-2 will be released and the slide will retract to the new position desired. The clamp nut 82 is then loosened and the boring slide is then advanced until it engages stop 132 and thereafter the pointer elements are set to zero and the clamp nut 82 and clamp screw 90 are tightened.

Figure 8:
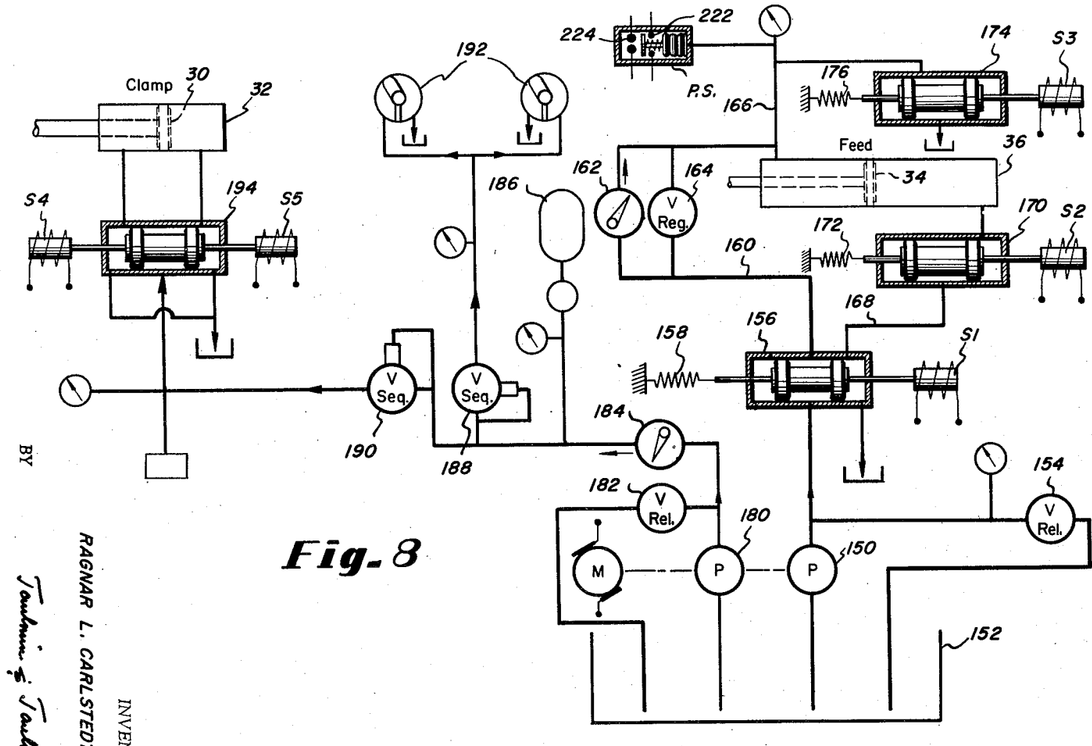
Figure 8 is a diagrammatic representation of the hydraulic control system by means of which the boring machine slides and steady rests are operated.

Figure 8 shows the hydraulic circuit for controlling the movement of the clamp slide and boring slide and the steady rests. In the circuit a pump 150 is arranged to draw fluid from a tank 152 and is by-passed relief valve 154 and discharges to the inlet of a four-way valve 156. Valve 156 has a valve member normally shifted leftwardly by spring 158 to connect the pressure inlet with conduit 160 which leads through the parallel arranged check and choke valves 162, 164, respectively, to a conduit 166 that is connected with the end of cylinder 36 on the retracting side of the piston 34.

Pertaining to valve 156 is a solenoid S-1 which, when energized, will move the valve member of the valve rightwardly and connect the pressure inlet of the valve to conduit 168 leading to the inlet of a valve 170 that has a single service port connected with the end of cylinder 36 opposite the connection thereto of conduit 166. Valve 170 has a valve member urged leftwardly by a spring 172 into position to interrupt communication between conduit 168 and service port of the valve while a solenoid S-2 is energizable for shifting the valve member to connect the service port with conduit 168.

Conduit 166 leads to a pressure switch PS that is normally open but it will close under the influence of a predetermined pressure. Conduit 166 also leads to one port of a valve 174 having a valve member normally urged leftwardly by spring 176 to connect the said port with exhaust while a solenoid S-3 pertaining to the valve member is energizable to shift the valve member into position to shut off the port from exhaust.

The hydraulic circuit also includes a pump section 180 also arranged to draw fluid from tank 152 and being by-passed by relief valve 182 and arranged to discharge through a check valve 184 into an accumulator 186 and also to the inlets of sequence valves 188 and 190. Sequence valve 188 is connected into a hydraulic circuit that supplies the motors 192 pertaining to the steady rests that support the boring bar. The valving of this portion of the circuit is not illustrated but a representative system of this nature can be found in the co-pending Carlstedt application, Serial No. 444,559, filed July 20, 1954, title: Boring Machines for Metal, now Patent No. 2,795,977, issued June 18, 1957.

Sequencing valve 190 is connected with the inlet of a four-way valve 194 which has its service ports connected with opposite ends of cylinder 32 of the clamp motor. A solenoid S-4 pertaining to the valve member of the valve is energizable to cause energization of the clamp motor in a direction to clamp a workpiece in the machine whereas energization of the solenoid S-5 pertaining to the valve will energize the clamp motor to release a workpiece from the machine.

The operation of the hydraulic circuit is as follows:

With the machine at rest all of the solenoids are deenergized. A workpiece is then placed in the machine and solenoid S-4 is energized to clamp the workpiece. Thereafter solenoids S-1 and S-2 are energized and this will bring about rapid advance of the boring slide. This comes about because energization of solenoids S-1 and S-2 will direct a supply of pressure to the right end of cylinder 36 while the left end thereof is being freely exhausted through valve 174.

The speed of advance of the boring bar is reduced to feed speed at a predetermined point in its travel by energization of solenoid S-3 which will interrupt the free exhaust from the left end of cylinder 36 and instead cause the exhaust to pass through choke valve 164, thus building up a controlling back pressure on piston 34. This pressure, incidentally, also causes closing of pressure switch PS.

At the end of an advancing stroke, solenoids S-1, S-2 and S-3 are deenergized to halt the advancing movement of the boring slide and thereafter rapid retraction of the boring bar can be had by energizing solenoid S-2 which will connect the right end of cylinder 36 with exhaust while simultaneously energizing solenoid S-3 which will interrupt the connection of the left end of cylinder 36 with exhaust whereby a supply of pressure fluid to the said left end is had through valve 156, the solenoid S-1 of which is deenergized.

At the end of the retraction stroke, movement of the boring slide is halted by deenergization of solenoids S-2 and S-3 and the bored workpiece can then be unclamped by deenergizing solenoid S-4 and energizing solenoid S-5.

Figure 9:
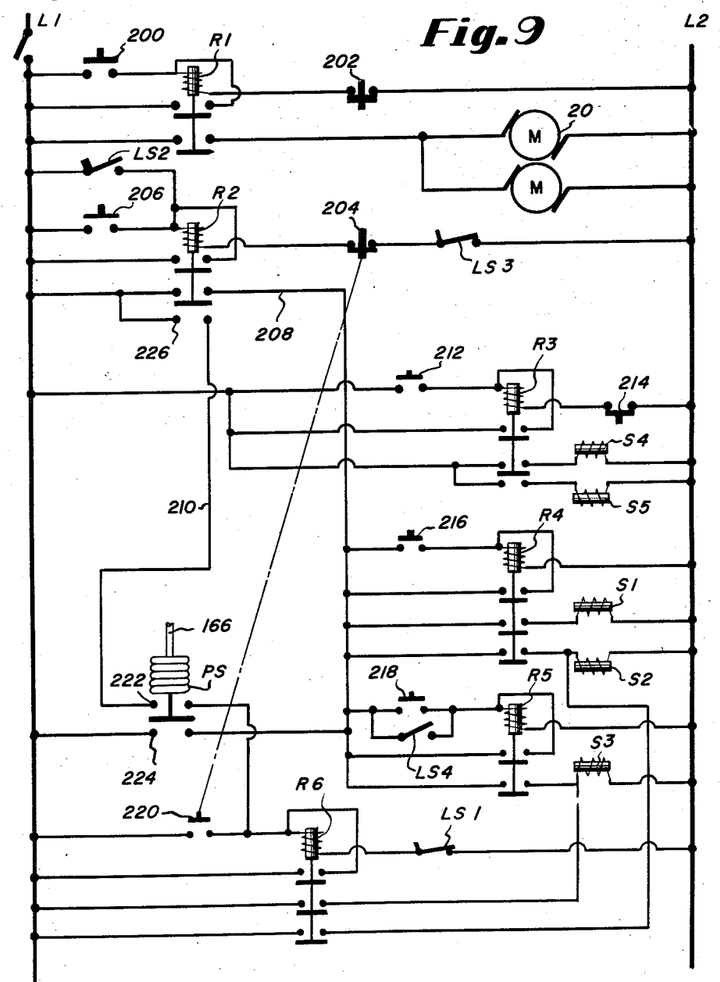
Figure 9 is a diagrammatic representation of one form which an electric control circuit for the machine could take.

The electrical circuit for controlling the several solenoids referred to above in connection with the hydraulic circuit is illustrated in Figure 9. In Figure 9 there is connected between power lines L-1 and L-2 the spindle motor 20 in series with the blade of a relay R-1 adapted for being energized by closing of a push button 200 and for being deenergized by opening of a second push button 202.

A second relay R-2 is connected between the power lines and has its coil connected through a normally closed limit switch LS-3 and a normally closed push button 204 and a normally open start switch 206. Closing of 206 will thus energize relay R-2 which will then hold through its own holding circuit.

The previously-mentioned limit switch LS-2 which is normally open is connected in parallel with start switch 206.

Limit switch LS-3 which is normally closed is located as will be seen in Figure 2 in position to be opened after the boring slide has gone on to its feed stroke.

Relay R-2, when energized, connects power line L-1 with a wire 208 and when deenergized connects power line with a wire 210.

The solenoids S-4 and S-5 of the clamp valve are arranged for being alternately energized by a relay R-3 which is energizable to cause energization of S-4 by closing a switch 212 and which is deenergizable to cause energization of S-5 by opening a switch 214.

Energization of solenoids S-1 and S-2 to place the boring slide in rapid advance is accomplished by energizing a relay R-4 that is under the control of a switch 216 that connects one side of the relay coil with wire 208, the other side of the coil being connected with line L-2.

Energization of solenoid S-3 to place the boring slide on feed stroke is accomplished by a relay R-5 adapted for being energized by closing a push button switch 218 or by closing of limit switch LS-4 which, as will be seen in Figure 2, is actuated in advance of the actuation of switch LS-3.

The retraction of the boring slide is accomplished by energization of solenoids S-2 and S-3 and this is accomplished by a relay R-6 adapted for energization by the closing of a blade 220 forming a part of reverse switch 204 previously referred to or by the closing of the pressure switch PS on its contacts 222 indicating a drop of pressure in conduit 166. While the pressure in conduit 166 is high indicating a proper feed speed, the blade of the pressure switch is closed on contacts 224 which complete a circuit between wire 208 and contacts 226 of relay R–2 that are closed when this relay is deenergized.

The electric circuit, in conjunction with the hydraulic circuit, operates as follows:

After clamping a workpiece in the machine, the spindle motor is started. Thereafter, switch 206 is closed to energize relay R–2 and establish an energizing circuit for relays R–4 and R–5 via wire 208. Closing of switch 216 will cause energization of relay R–4 and therethrough the energization of solenoids S–1 and S–2 which will cause rapid advance of the boring slide. When the boring slide engages limit switch LS–4 just before the boring tool engages the work, the relay R–5 will be closed, thus energizing solenoid S–3 and slowing the boring slide down to its feed rate. When the boring slide goes on its feed rate, pressure in conduit 166 will rise and close contacts 224. Shortly after engaging switch LS–4, switch LS–3 will be opened to permit deenergization of relay R–2 but at this time this will be without effect because contacts 224 of the pressure switch are closed.

If the boring tool becomes dull and the advancing movement of the boring slide slows down, then the pressure in conduit 166 will drop and the pressure switch will open contacts 224, thus deenergizing relays R–4 and R–5 and solenoids S–1, S–2 and S–3 and will close on contacts 222 thereby energizing relay R–6 and therethrough energizing solenoids S–2 and S–3, thus causing rapid retraction of the boring bar from the work.

The boring bar can then be changed and returned into the work and at which time, as described previously, the indicator mechanism of the present invention will show the operator at what point the boring bar will again engage the work.

If, however, the boring bar does not become dull and the boring operation proceeds until the bore is almost completed, the limit switch LS–2 of the indicator device will be engaged and closed by element 120 on ring 100 and this will then again energize relay R–2 to establish a direct connection from power line L–1 to wire 208 and will interrupt the connection between contacts 222 of the pressure switch and wire L–1 whereby the pressure switch becomes ineffective and the final part of the boring operation will be carried out without being effected by the pressure switch. When the boring tool breaks through the work, the boring slide will then come to a stop against abutment 132 and there will be no automatic retraction of the boring slide. This permits switch 202 to be operated to halt the spindle motor so that the boring bar can be retracted through a workpiece that is not rotating thereby preventing an oversize cut from being taken.

After the spindle motor stops, switch 202 is pressed which will deenergize relay R–2 thereby deenergizing relays R–4 and R–5 and at the same time energizing relay R–6 to cause retraction of the boring slide. When the boring slide is fully retracted, actuating element 98 connected with pointer element 86 will engage and open limit switch LS–1 in circuit relay R–6 thereby deenergizing the said relay and therethrough deenergizing solenoids S–2 and S–3 and bringing the boring slide to a halt in its retracted position.

It will be understood that when the boring bar is retracted prior to the completion of a boring operation, outer indicator element 100 will stay in its advanced position while indicator element 86 retracts with the boring bar whereas, when the boring operation is completed, both of the indicator elements retract together with the boring bar.

It will be apparent that the machine according to the present invention is adapted for many refinements in the control system. For example, the spindle motor and the motor driving the coolant pump could be arranged for being automatically deenergized when the boring slide reaches its fully advanced position whereby retraction of the boring slide and unclamping of the workpiece could then immediately be carried out and a new workpiece put in place.

Also, it will be evident that energization of the spindle motor and of the coolant pump could take place after initiating advancing movement of the boring slide whereby the simple operation of initiating movement of the boring slide will set the entire machine into operation.

It will also be evident that means could be provided whereby, following the retraction of the boring bar from the work, due to the dulling of the cutting edge thereof, the next following advance of the boring bar back into the work could be carried out at a rapid advance rate until the end of the boring bar was almost to the point where it would again engage the workpiece.

It will be understood that this invention is susceptible to modification in order to adapt it to different usages and conditions; and, accordingly, it is desired to comprehend such modifications within this invention as may fall within the scope of the appended claims.

I claim:

1. An indicator device of the nature described comprising a housing having a graduated dial ring, a first indicator member rotatable on the axis of said housing inside said ring, a drive shaft for said member, a clutch part on the shaft and a clutch part adjustably mounted on the indicator member, said clutch parts being adapted for frictional driving engagement, a torsion spring biasing the clutch part on the indicator member in one direction, a spring biasing the drive shaft in the opposite direction, a second indicator member surrounding the first indicator member and also inside the dial, abutment means forming a driving connection between said indicator members in one direction, other means for establishing a driving connection between the members in the opposite direction when the said members are in a predetermined advanced position, and switch means carried by the indicator device under the control of said first and second indicator members.

2. In an indicator device of the nature described; a housing having a dial ring, a first indicator member rotatable on the axis of the housing, a drive shaft for said member, releasable clutch means between said member and said drive shaft and comprising a part frictionally adjustable relative to the indicator member, a second indicator member in the frame inside the dial ring and surrounding the first indicator member, abutment means between the members whereby the first indicator member will drive the second indicator member in one direction only, other drive means adapted for connecting said indicator members when in their fully advanced position for return thereof together, switch means under the control of second indicator member adapted for actuation thereby when the second member is in its advanced position, and other switch means adapted for actuation by the said part of said clutch means when the said first indicator member is in its fully retracted position.

3. In a boring machine of the nature described having a boring slide movable from a retracted position to a predetermined advanced position, an indicator device having a shaft rotatable in unison with movement of the boring slide, a first clutch part on said shaft, a second clutch part frictionally engageable with said first clutch part, a first indicator member adjustably connected with said second clutch part, a second indicator member surrounding said first indicator member and adapted for being abutted thereby and driven thereby when the first indicator member is rotated by advancing movement of the boring slide, second means adapted for connecting said members when the boring slide reaches its fully advanced position for causing return movement of said indicator members in unison when the boring slide retracts, a first switch adapted for actuation by said second indicator member as the boring slide approaches the end of its advancing movement, and second switch means adapted for actuation by said second clutch part as the boring slide reaches its fully retracted position.

4. In a boring machine having a boring slide movable from a retracted position to a predetermined advanced position, an indicator device for indicating the depth of the hole being bored in the workpiece and the position of the boring bar in the workpiece comprising a shaft connected with the boring slide to be driven in one direction thereby when the slide advances and in the opposite direction when the slide retracts, a first indicator member adjustably connected with said shaft, a dial on the indicator device, said indicator member being adapted to point to zero on the dial when the slide is fully advanced, a second indicator member associated with the dial adapted for being abutted by the first indicator member and driven thereby when the first indicator member is rotated by advancing movement of the boring slide, normally ineffective drive means adapted for inter-connecting said members when the boring slide reaches its fully advanced position and the indicator members are pointing to zero on the dial for causing return movement of the indicator members in unison when the boring slide retracts, said means becoming again ineffective as soon as the boring slide moves in its advancing direction, a first switch carried by the indicator device adapted for actuation by said second indicator member as the boring slide approaches the end of its advancing movement, and a second switch carried by the indicator device adapted for actuation by said first indicator member when the boring slide reaches its fully retracted position.

5. In a boring machine having a boring slide movable from a retracted position to a predetermined advanced position, an indicator device for indicating the depth of the hole being bored in the workpiece and the position of the boring bar in the workpiece comprising a shaft connected with the boring slide to be driven in one direction thereby when the slide advances and in the opposite direction when the slide retracts, a first indicator member adjustably connected with said shaft, a dial on the indicator device, said indicator member being adapted to point to zero on the dial when the slide is fully advanced, a second indicator member associated with the dial adapted for being abutted by the first indicator member and driven thereby when the first indicator member is rotated by advancing movement of the boring slide, normally ineffective drive means adapted for interconnecting said members when the boring slide reaches its fully advanced position and the indicator members are pointing to zero on the dial for causing return movement of the indicator members in unison when the boring slide retracts, said means becoming again ineffective as soon as the boring slide moves in its advancing direction, a first switch carried by the indicator device adapted for actuation by said second indicator member as the boring slide approaches the end of its advancing movement, and a second switch carried by the indicator device adapted for actuation by said first indicator member when the boring slide reaches its fully retracted position, there being a member adjustably connected with said first indicator member for engaging said second switch means whereby the retracted position of said boring slide can be varied.

6. In combination in a boring machine of the nature described having a boring slide and a fluid motor connected with the slide, an indicator device connected to be driven by the slide comprising a first index member rotatable with the slide to indicate the exact position occupied by the boring bar, a second indicator member driven in one direction by the first indicator member and thus operable to indicate the point of maximum advance of the boring slide, first means operable for causing advancing movement of the boring slide, second means operable in response to a predetermined resistance encountered by the boring slide for causing retraction thereof, third means operable for halting the boring slide in its fully advanced position, fourth means for causing retraction of the boring slide from its fully advanced member for making said fourth means ineffective when the boring slide reaches its fully retracted position, and second switch means operable by said second indicator member when the boring slide approaches its fully advanced position for making said second means inoperative.

7. In a boring machine of the nature described; a boring slide, first means operable for causing advancing of the boring slide, second means operable for causing retraction of the boring slide in response to a predetermined resistance encountered thereby, an indicator device connected with the boring slide comprising a first indicator member movable in unison with the boring slide whereby it always indicates the actual position of the boring slide and a second indicator member abutted by the first indicator member to be driven in the advancing direction only thereby and thus indicating the point of maximum advance of the boring slide, switch means operated by said second indicator member as the boring slide reaches a predetermined advanced point in its travel for making the said second means inoperative, manual means for thereafter making the said second means operable to cause retraction of the boring slide, and switch means operated by the said first indicating member for making the said second means inoperative at the end of the retracting stroke of the slide.

8. In an indicator member for a boring machine having a boring slide; a frame, an indicator dial on the frame, concentric indicator members in the frame each having an index mark to register with the said dial, means connecting one of said indicator members with the boring slide for movement therewith and said indicator member being adjustable relative to the said drive so its index mark points to zero on the dial when the boring slide is fully advanced, means forming an abutting driving engagement between said members in the advancing direction thereof when the index marks on the said members coincide, and means operable to drivingly interconnecting said index members when the boring slide is fully advanced for the retraction of the said members in unison.

9. In an indicator member for a boring machine having a boring slide; a frame, an indicator dial on the frame, concentric indicator members in the frame each having an index mark to register with the said dial, means connecting one of said indicator members with the boring slide for movement therewith and said indicator member being adjustable relative to the said drive so its index mark points to zero on the dial when the boring slide is fully advanced, means forming an abutting driving engagement between said members in the advancing direction thereof when the index marks of the said members coincide, and means operable for drivingly interconnecting said index members when the boring slide is fully advanced for the retraction of the said members in unison, said last mentioned means becoming ineffective upon initiation of advancing movement of said boring slide.

10. In an indicator and control device for a boring machine and a reciprocal boring slide, a frame, a graduated dial on the frame, concentric indicator members in the frame each having an index mark for registration with the said dial, a drive from the boring slide to one of the said indicator members including a friction clutch for adjustment of the said indicator member whereby its index mark can be caused to point to zero on the dial when the boring slide is fully advanced, means on the said one index member abutting the other to drive it in the advancing direction only when the index marks of the dial coincide, and normally ineffective drive means for drivingly connecting the indicator members for movement in unison in the reverse direction, said last mentioned means being arranged to become effective as the boring slide approaches its fully advanced position and adapted for becoming ineffective when the boring slide commences an advancing movement following a retraction movement thereof.

11. In an indicator and control device for a boring machine having a boring slide, a frame having a graduated dial ring, a pair of concentric indicator members in the frame each having an index mark to register with said dial, a drive from the boring slide to one of the said indicator members so the said one indicator member moves with the boring slide, said driving connection including a clutch so the indicator members can be adjusted to point to zero on the dial when the boring slide is fully advanced, said one indicator member being adapted for driving the other indicator member in the advancing direction only when the index marks are in alignment, a normally ineffective drive for connecting the index members for movement together in the opposite direction arranged for becoming effective when the boring slide is fully advanced and for becoming ineffective when the boring slide commences advancing movement following a retraction stroke thereof, and switch means adapted for actuation by said one indicator member when the boring slide reaches its fully advanced position for interrupting the advancing movement of the boring slide and for deenergizing the drive motor and coolant pump of the machine.

12. In a boring machine; a frame, a boring slide movable on said frame, and indicator means for indicating the position of the boring slide on the frame and the point of maximum advance of the boring slide, said indicator means comprising a stationary indicator dial, concentric indicator members associated with the dial, a drive from the boring slide to one of the indicator members for movement of the indicator member therewith, a one-way drive between said indicator members in the advancing direction of the boring slide, and a normally ineffective driving connection adapted for being established between said indicator members when the boring slide is fully advanced and becoming ineffective when the boring slide commences an advancing movement following retraction thereof.

13. In a boring machine; a frame, a boring slide movable on said frame, and indicator means for indicating the position of the boring slide on the frame at the point of maximum advance of the boring slide, said indicator means comprising a stationary indicator dial, concentric indicator members associated with the dial, a drive from the boring slide to one of the indicator members for movement of the indicator member therewith, a one-way drive between said indicator members in the advancing direction of the boring slide, and a normally ineffective driving connection adapted for being established between said indicator members when the boring slide is fully advanced and becoming ineffective when the boring slide commences an advancing movement following retraction thereof, there being a friction clutch in said driving connection.

References Cited in the file of this patent

UNITED STATES PATENTS

| 1,888,298 | Teesdale | Nov. 22, 1932 |
| 2,642,847 | Roys | June 23, 1953 |
| 2,790,340 | Cross | Apr. 30, 1957 |

FOREIGN PATENTS

| 339,643 | Germany | July 29, 1921 |
| 1,096,352 | France | June 20, 1955 |